No. 892,676. PATENTED JULY 7, 1908.
D. H. MOSTELLER.
FRUIT AND VEGETABLE PITTER.
APPLICATION FILED JUNE 27, 1907.
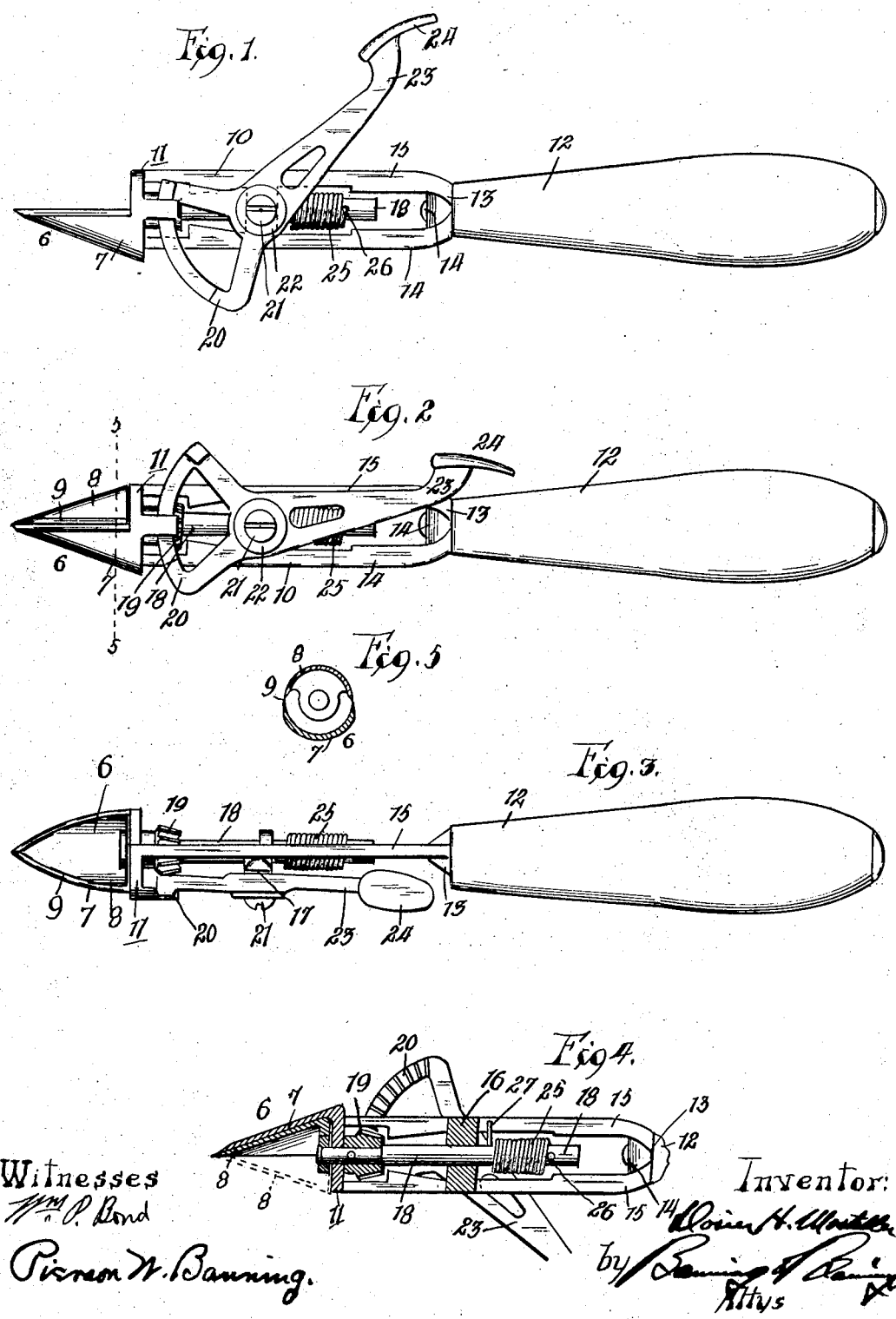
Witnesses
Wm. P. Bond
Pierson W. Banning.
Inventor:
David H. Mosteller
by Banning & Banning
Attys

UNITED STATES PATENT OFFICE.

DOSIER H. MOSTELLER, OF CHICAGO, ILLINOIS, ASSIGNOR TO THE MOSTELLER MANUFACTURING COMPANY, OF CHICAGO, ILLINOIS, A CORPORATION OF ILLINOIS.

FRUIT AND VEGETABLE PITTER.

No. 892,676.        Specification of Letters Patent.        Patented July 7, 1908.

Application filed June 27, 1907. Serial No. 381,077.

*To all whom it may concern:*

Be it known that I, DOSIER H. MOSTELLER, a citizen of the United States, residing at Chicago, in the county of Cook and State of Illinois, have invented certain new and useful Improvements in Fruit and Vegetable Pitters, of which the following is a specification.

This invention relates to that class of pitters which are especially adapted for use in pitting pineapples and other fruits and vegetables.

Objection is had to practically all pitters now in use because difficulty is experienced in rapidly and automatically discharging the pit from the cutter of the instrument.

The present invention has for its object to provide suitable and efficient means for readily pitting fruit or vegetables with but slight effort on the part of the operator, and at the same time with little or any waste of the substance acted upon.

The invention consists in the features of construction and combination of parts hereinafter described and claimed.

In the drawings, Figure 1 is a side elevation of the device in its normal position; Fig. 2 a similar view with the lever down; Fig. 3 a top or plan view of the same; Fig. 4 a view taken on the opposite side to that shown in Figs. 1 and 2; and Fig. 5 a transverse section taken on line 5—5 of Fig. 2.

The fruit or vegetable pitter 6 of the present invention comprises a fixed outer gouge 7, having a movable cutter 8 positioned therein. Both the fixed outer gouge and the movable cutter aforesaid are mounted concentrically with respect to one another, and owing to the nature of the work intended to be performed are preferably made of German silver. The movable cutter 8 has sharp cutting edges 9 which, when the movable cutter is in operative position, are adapted to sever the pit or core from the fruit or vegetable acted upon.

A frame 10 is secured at its front cross wall 11 to the concentrically positioned gouge and cutter aforesaid. A handle 12 is secured to the rear cross wall 13 by suitable fastening means 14. To the lower and upper side rails 14 and 15, respectively, of the frame, and near the middle thereof, is a cross wall 16 which has a lug 17 formed thereon. A revoluble shaft 18 is journaled within the middle and front cross walls 16 and 11, respectively, of the frame. To the front end of the revoluble shaft is secured the movable cutter 8. A pinion 19 is secured upon the revoluble shaft 18 adjacent to the front cross wall 11. Upon the lug 17 is mounted a segmental rack 20 which intermeshes with the pinion 19 aforesaid, said rack being retained in position by a screw 21 contacting a washer 22, as shown. The rack structure, as a whole, comprises upper and lower diverging arms terminating in a lever 23, which, at its inner end, has a thumb or finger piece 24. Toward the rear end of the revoluble shaft, and about the same, is positioned a coil spring 25 having its inner end 26 passed through the shaft, as shown, and its outer end 27 contacting the upper rail of the frame 10.

From the foregoing it will be seen that by depressing the lever 23, which in turn actuates the pinion 19, the shaft 18 will be caused to revolve, and, as this occurs, the tension of the spring will be considerably increased. As the front end of this revoluble shaft is secured to the movable cutter 8, which is concentrically mounted with respect to the fixed gouge 7 and has a tapered spoon formation, said movable cutter will be caused to revolve to such a position as will enable the sharp cutting edges 9 thereof to sever the pit or core from the fruit or vegetable acted upon. The spring being under tension will cause the movable cutter to automatically resume its normal position within the fixed gouge, as shown in Fig. 3.

Owing to the peculiar construction of the fixed gouge and movable cutter, it will be seen that the pitter is capable of doing its work as satisfactorily when the entire gouge is inserted into the substance as when the point thereof is but slightly embedded therein. Furthermore, by utilizing the instrumentalities employed in performing this work, it is obvious that the cutting and severing of the pit will be surely and easily effected.

It will be noted that the pitter of the present invention is especially adapted and intended to be used upon fruits and vegetables, generally; that the pitting thereof may be surely and quickly effected; that, owing to the simplicity of the device as a whole, the parts thereof may be readily cleaned when desired, and, finally, another serious objection which this device overcomes is that, after the pit has been cut from the fruit or vegetable, it is discharged automatically from the pitter itself. This is accomplished by reason of the tension of the spring on the revoluble shaft, which, when the cutting operation has been performed, causes the movable cutter to instantly resume its normal position within the fixed gouge, and, as this occurs, it always throws the pit away from the device.

What I claim as new and desire to secure by Letters Patent is:

1. In combination with a fruit and vegetable pitter, a fixed scoop shaped gouge, a pivoted cutter concentrically positioned within the fixed gouge and provided with cutting edges, and means for actuating the movable cutter and discharging the severed matter therefrom, substantially as described.

2. In combination with a fruit and vegetable pitter, a tapered fixed gouge, a tapered movable cutter concentric with the fixed gouge, a revoluble shaft having one of its ends connected to the movable cutter, a pinion on the revoluble shaft, a rack engaging the pinion and having a thumb piece on one end thereof, a spring on the revoluble shaft, and a handle for holding the device, substantially as described.

3. In combination with a fruit and vegetable pitter, a fixed outer gouge, an inner movable cutter, a frame connecting the aforesaid gouge and cutter with a handle, a handle for holding the device, a revoluble shaft having one of its ends connected with the movable cutter, and means for actuating the movable cutter, substantially as described.

4. In a fruit and vegetable pitter, the combination of a fixed outer gouge, an inner movable cutter, a frame having its end walls engage the gouge and handle, a revoluble shaft having its outer end secured to the movable cutter and journaled within the middle and front cross walls of the frame, a pinion secured to the revoluble shaft, a segmental rack intermeshing with the aforesaid pinion and comprising a lever and thumb piece, the lever being pivoted to the frame and adapted to be depressed by the thumb piece on its end, a spring near the inner end of the revoluble shaft adapted to restore the movable cutter to its normal position after the cutting operation, and a handle for holding the device, substantially as described.

DOSIER H. MOSTELLER.

Witnesses:
WALKER BANNING,
PIERSON W. BANNING.